United States Patent
Shan et al.

(10) Patent No.: US 8,913,576 B2
(45) Date of Patent: Dec. 16, 2014

(54) METHOD AND APPARATUS FOR TRANSMITTING AND RECEIVING CONTROL INFORMATION IN A WIRELESS COMMUNICATION SYSTEM

(71) Applicant: Samsung Electronics Co., Ltd., Gyeonggi-do (KR)

(72) Inventors: Cheng Shan, Gyeonggi-do (KR); Youn-Sun Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 60 days.

(21) Appl. No.: 13/657,323

(22) Filed: Oct. 22, 2012

(65) Prior Publication Data

US 2013/0100901 A1    Apr. 25, 2013

Related U.S. Application Data

(60) Provisional application No. 61/549,474, filed on Oct. 20, 2011.

(51) Int. Cl.
   *H04W 4/00* (2009.01)
   *H04L 5/00* (2006.01)

(52) U.S. Cl.
   CPC ............................ *H04L 5/0048* (2013.01)
   USPC ........................................................ 370/329

(58) Field of Classification Search
   None
   See application file for complete search history.

(56) References Cited

U.S. PATENT DOCUMENTS

| | | | |
|---|---|---|---|
| 2010/0279628 A1* | 11/2010 | Love et al. | 455/70 |
| 2011/0170498 A1 | 7/2011 | Liu et al. | |
| 2011/0237270 A1 | 9/2011 | Noh et al. | |
| 2012/0063349 A1 | 3/2012 | Kim et al. | |
| 2013/0044727 A1* | 2/2013 | Nory et al. | 370/330 |

FOREIGN PATENT DOCUMENTS

| WO | WO 2010/053984 | 5/2010 |
|---|---|---|
| WO | WO 2010/131929 | 11/2010 |

OTHER PUBLICATIONS

Samsung, "DL Control Signaling Enhancements", R1-113100, 3GPP TSG RAN WG1 #66bis, Oct. 10-14, 2011.

Alcatel-Lucent et al., "Design Details for Enhanced PDCCH", R1-113322, 3GPP TSG RAN WG1 Meeting #66bis, Oct. 10-14, 2011.

Research in Motion, UK Limited, "Design Consideration for E-PDCCH", R1-113236, 3GPP TSG RAN WG1 Meeting #66 bis, Oct. 10-14, 2011.

LG Electronics, "Remaining Details in Non-interleaving R-PDCCH Transmission", R1-106135, 3GPP TSG RAN WG1 Meeting #63, Nov. 9, 2010.

* cited by examiner

*Primary Examiner* — Abdullah Riyami
(74) *Attorney, Agent, or Firm* — The Farrell Law Firm, P.C.

(57) ABSTRACT

A method and an apparatus are provided for transmitting and receiving control information in wireless communication system. An eNB generates control information, and transmits the control information using at least one enhanced Control Channel Element (eCCE) and at least one antenna port. The at least one antenna port is determined according to at least one of a starting index of the at least one eCCE and an aggregation level of the at least one eCCE.

20 Claims, 10 Drawing Sheets

METHOD AND APPARATUS FOR TRANSMITTING AND RECEIVING CONTROL INFORMATION IN A WIRELESS COMMUNICATION SYSTEM

PRIORITY

This application claims the priority under 35 U.S.C. §119 (e) to U.S. Provisional Application Ser. No. 61/549,474, which was filed in the United States Patent and Trademark Office on Oct. 20, 2011, the entire content of which is hereby incorporated by reference.

BACKGROUND OF THE INVENTION

1. Field of the Invention

The present invention relates generally to transmission and reception of signals in a wireless communication system, and more particularly, to a method and an apparatus for providing an implicit mapping between DeModulation Reference Signals (DMRS) and control channels.

2. Description of the Related Art

In 3rd Generation Partnership Project (3GPP) Long-Term Evolution (LTE) releases 8 to 10, a control channel is transmitted in the first a few Orthogonal Frequency Division Multiplexing (OFDM) symbols of a subframe. As the system continues to evolve and more users are to be scheduled in the same subframe, the legacy control channel capacity will bottleneck for further performance enhancement. To enhance the capacity of control channel, an enhanced Control CHannel (eCCH) is designed using remaining OFDM symbols in a subframe, which was previously allocated for data transmission in the legacy systems.

Multiple eCCHs for the same or multiple User Equipments (UEs) can be multiplexed in one resource block. The multiple eCCH may have different reference signals on different antenna ports for demodulation. Therefore, in order to recover the information transmitted on an eCCH, a user must acquire the mapping between the eCCH and the reference signals before demodulation.

SUMMARY OF THE INVENTION

Accordingly, the present invention is designed to address at least the problems and/or disadvantages described above and to provide at least the advantages described below.

An aspect of the present invention is to provide a method and an apparatus for building mapping relations between eCCEs and reference signal ports in a wireless communication system.

Another aspect of the present invention is to provide a system that uses a particular set of antenna ports for enhanced control channel transmission in given eCCEs.

Another aspect of the present invention is to provide a system that use a particular set of antenna ports for all eCCEs used for an enhanced control channel transmission.

In accordance with an aspect of the present invention, a method is provided for transmitting control information to a user equipment in a wireless communication system in which multiple antenna ports are defined. The method includes generating the control information; and transmitting the control information using at least one enhanced Control Channel Element (eCCE) and at least one antenna port. The at least one antenna port is determined according to at least one of a starting index of the at least one eCCE and an aggregation level of the at least one eCCE.

In accordance with another aspect of the present invention, a method is provided for receiving control information from an enhanced Node B (eNB) in a wireless communication system in which multiple antenna ports are defined. The method includes receiving the control information transmitted using at least one enhanced Control Channel Element (eCCE) and at least one antenna port, and decoding the control information. The at least one antenna port is determined according to at least one of a starting index of the at least one eCCE and an aggregation level of the at least one eCCE.

In accordance with another aspect of the present invention, an apparatus of an eNB is provided for transmitting control information to a UE in a wireless communication system in which multiple antenna ports are defined. The apparatus includes a controller that generates the control information; and a transmitter that transmits the control information using at least one enhanced Control Channel Element (eCCE) and at least one antenna port. The at least one antenna port is determined according to at least one of a starting index of the at least one eCCE and an aggregation level of the at least one eCCE.

In accordance with another aspect of the present invention, an apparatus of a UE is provided for receiving control information from an eNB in a wireless communication system in which multiple antenna ports are defined. The apparatus includes a receiver that receives the control information transmitted using at least one enhanced Control Channel Element (eCCE) and at least one antenna port; and a controller that decodes the control information. The at least one antenna port is determined according to at least one of a starting index of the at least one eCCE and an aggregation level of the at least one eCCE.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Hereinafter, various embodiments of the present invention will be described with reference to the accompanying drawings. In the following description, the same elements will be designated by the same reference numerals although they are shown in different drawings. Further, various specific definitions found in the following description are provided to help general understanding of the present invention, and it is apparent to those skilled in the art that the present invention can be implemented without such definitions.

Further, in the following description of the present invention, a detailed description of known functions and configurations incorporated herein will be omitted to avoid obscuring the subject matter of the present invention in unnecessary detail.

The embodiments of the present invention described below are applicable to, but not limited to, transfer of information in wireless communications systems, e.g., for use in an Evolved Universal Mobile Telecommunications System Terrestrial Radio Access Network. For example, although the specification describes a system based on compatibility among an LTE-system, an LTE-A system, and their next/previous systems, the present invention is applicable to other types of wireless communication systems operating control channels.

The following embodiments of the present invention relate generally to a wireless cellular communication system including at least one Base Station (BS) or eNB and at least one Mobile Station (MS) or UE. More specifically, in the wireless cellular communication system, the eNB schedules both downlink and uplink transmissions to and from a UE. The scheduling can be on a per-sub-frame basis, where a scheduling indication is transmitted from the eNB to an UE via the control channel in each sub-frame of downlink transmission.

Herein, a system operating according to 3GPP LTE Releases 8 to 10 is regarded as "a legacy system" and a system operating according to the in-development Release 11 and later releases is regarded as a system where the embodiments of the present invention can be implemented.

Downlink data information is conveyed through a Physical DL Shared CHannel (PDSCH). Downlink Control Information (DCI) includes a Downlink Channel Status Information (DL CSI) feedback request to UEs, Scheduling Assignments (SAs) for UpLink (UL) transmission transmissions from UEs (hereinafter, UL SAs) or SAs for PDSCH receptions by UEs (hereinafter, DL SAs). The SAs are conveyed through DCI formats transmitted in respective Physical DL Control CHannels (PDCCHs). In addition to SAs, PDCCHs may convey DCI that is common to all UEs or to a group of UEs.

In a 3GPP LTE/LTE-A system, the downlink transmission utilizes Orthogonal Frequency Division Multiple Access (OFDMA), such that an entire system bandwidth is divided into multiple subcarriers. In an example, a group of 12 consecutive subcarriers are referred to as a Resource Block (RB), where an RB is the basic unit of resource allocation in the LTE/LTE-A system. In the time domain, the basic unit of resource allocation in the LTE/LTE-A system is a subframe.

Figure 1:
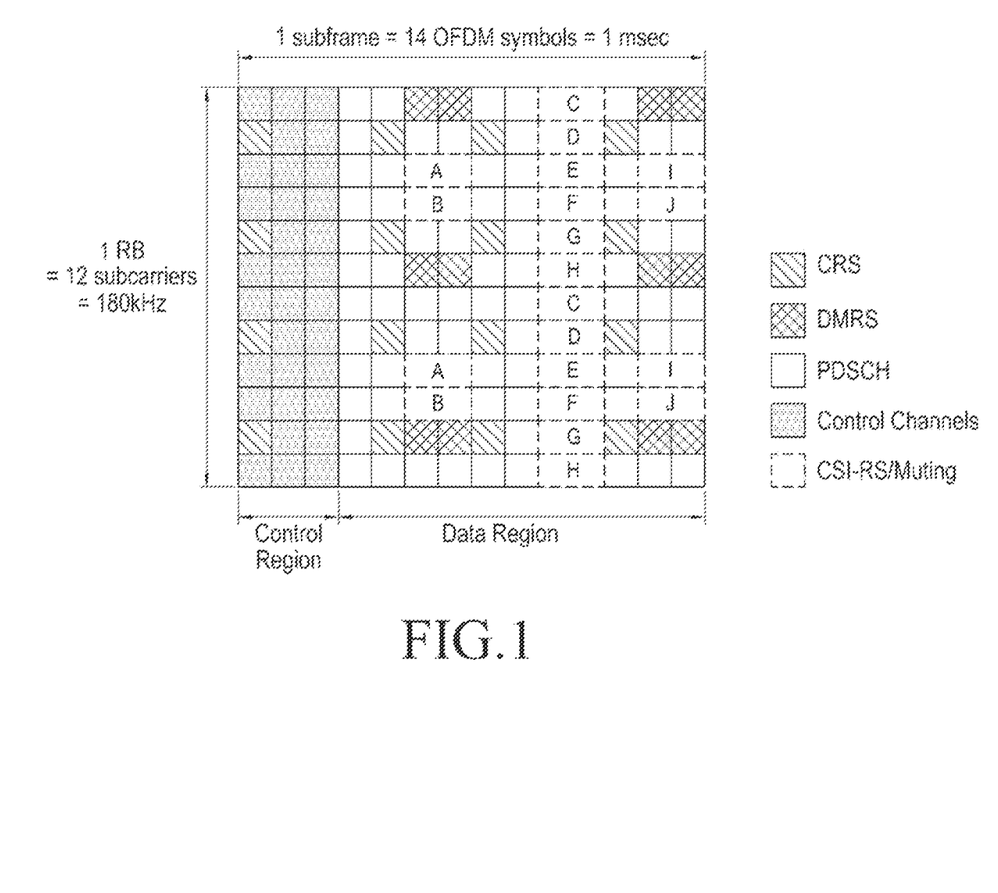
FIG. 1 illustrates a basic unit of resource allocation in an LTE/LTE-Advanced (A) system.

FIG. 1 illustrates a basic unit of resource allocation in an LTE/LTE-A system.

Referring to FIG. 1, each subframe includes 14 consecutive OFDM symbols. A Resource Element (RE) is an intersection of a subcarrier and an OFDM symbol represented by a square in FIG. 1, where a single modulation symbol can be transmitted.

In FIG. 1, different time and frequency resources can be used to transmit different signal types. A Cell specific Reference Signal (CRS) is transmitted to support UE mobility, e.g., initial access and handover operations, and to support legacy PDSCH transmission modes. A DeModulation Reference Signal (DMRS) is transmitted to support new PDSCH transmission modes. Control channels are transmitted to inform the UE of size of the control region, downlink/uplink scheduling assignments, and ACKnowledgement (ACK)/Negative ACK (HACK) for uplink Hybrid Automatic Repeat reQuest (HARQ) operations. A CSI-RS is transmitted to provide UEs with a reference signals for measuring the downlink channel for CSI feedback purposes. A CSI-RS can be transmitted on any of the group of REs marked with indices A, . . . , J.

Additionally, zero power CSI-RS or muting can be configured. In such a case, the RE positions marked by indices A, . . . , J are not used for the transmission of a reference signal, data signal, or control signal. Zero power CSI-RS or muting is used in an LTE-A system to enhance the measurement performance of UEs receiving a CSI-RS from neighboring transmission points. The PDSCH is transmitted in the data region on REs that are not used for the transmission of a CRS, a DMRS, a CSI-RS, or a zero power CSI-RS.

An eNB transmits a PDCCH in legacy LTE/LTE-A systems for various purposes, e.g., uplink/downlink scheduling assignments or CSI feedback request indications. Due to the nature of an OFDMA system, which enhances performance using frequency selective scheduling and simultaneous transmissions to multiple UEs, optimized system performance necessitates multiple PDCCHs to be transmitted to multiple UEs. Additionally, supporting Multi-User Multiple Input Multiple Output (MU-MIMO), where PDSCH transmissions for different UEs are spatially separated using antenna technology, also requires simultaneous PDCCH transmissions to multiple UEs.

In 3GPP releases 8 to 10, the control channel is usually transmitted in the beginning of a sub-frame, in order that the UE can efficiently acquire the scheduling information early enough for data decoding. The PDCCH is transmitted in the first one to three OFDM symbols in a sub-frame.

In order to provide the system with sufficient capacity for transmitting downlink/uplink scheduling assignments, a new CCH, i.e., an Enhanced Physical Data Control Channel (E-PDCCH or ePDCCH) was developed in LTE-A Release 11 to cope with the shortage of PDCCH capacity. A key factor that causes the shortage of PDCCH capacity is that it is transmitted only in the first one to three OFDM symbols of a subframe.

Further, with frequent MU-MIMO transmissions, where multiple UEs can be scheduled using the same frequency and time resources, the improvement on LTE/LTE-A systems is severely limited due to the shortage of PDCCH capacity. Unlike the PDCCH, the ePDCCH is transmitted on the data region of a subframe, much like a PDSCH.

PDCCH Structure in LTE Rel8

In 3GPP LTE Releases 8 to 10, a PDCCH is presented in the first several OFDM symbols. The number of OFDM symbols used for PDCCH is indicated in another Physical Control Format Indication Channel (PCFICH) in the first OFDM symbol. Each PDCCH includes L CCEs, where L=1, 2, 4, and 8, representing different CCE aggregation levels. Each CCE includes 36 sub-carriers distributed throughout the system bandwidth.

PDCCH Transmission and Blind Decoding

Multiple PDCCHs are first attached with a user-specific CRC, and then independently encoded and rate matched according to CCE aggregation level 1, 2, 4 or 8, depending on link qualities. Thereafter, the PDCCHs multiplexed and mapped to the PDCCH resources. At the UE side, the UE searches for its PDCCHs in a pre-determined search space by assuming a certain CCE aggregation level and using the user-specific CRC. This is called blind decoding, as the user may try multiple decoding attempts before the PDCCH is located and identified.

DCI Transmission

Usually, a PDCCH transmission refers to a DCI transmission. There can be multiple DCIs targeting one UE in a subframe, and a DCI could be targeting multiple UEs. Additionally, there are multiple types of DCI formats. For example, a downlink grant carries the resource allocation and transmission properties for PDSCH transmission in the present subframe, and an uplink grant carries the resource allocation and transmission properties for PUSCH transmission in the uplink subframe.

PDSCH Transmission and UE-Specific Reference Signals

All OFDM symbols after the PDCCH region can be assigned as PDSCH. The data symbols are mapped onto the sub-carriers of OFDM symbols, expect for resource elements assigned for reference signals.

UE-specific reference signals, i.e., DMRSs, are introduced into the system for simple implementation for beamforming transmission, where multiple antennas are precoded with different weights before transmission. The UE-specific reference signals are precoded with the same precoder as that of the data transmitted in the same resource block. By applying a precoder, the received signals act as signals from a few new antenna ports. Thus, the UE is able to decode the received signals assuming the signal is transmitted from those virtual antenna ports, i.e., DMRS ports, without knowing the exact precoder information.

Figure 2:
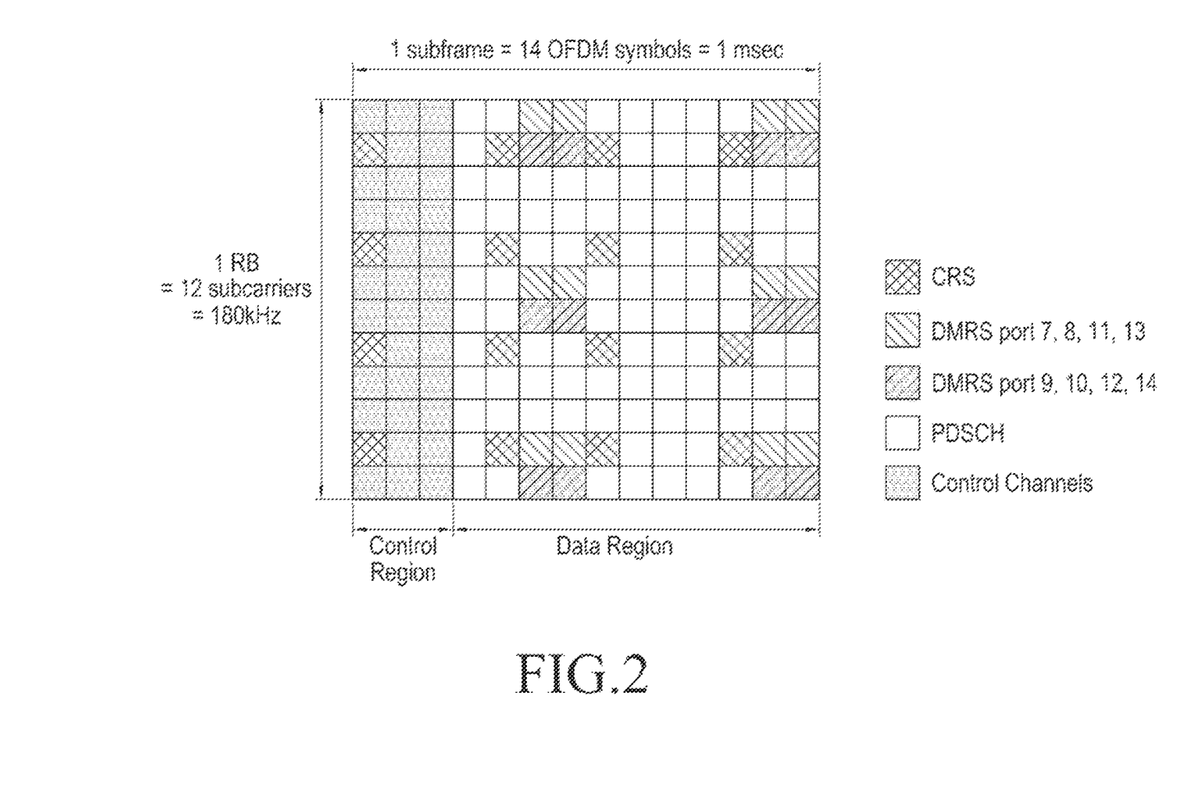
FIG. 2 illustrates antenna ports used in a resource block.

FIG. 2 illustrates antenna ports used in a resource block. Specifically, FIG. 2 illustrates DMRS ports in a resource block according to a location and port definition of a DMRS in 3GPP Release 10.

Referring to FIG. 2, the location and port definition can support up to eight ports from #7 to #14. When up to 4 DMRS ports are used, ports #7/8/9/10 are spread with a spreading factor of two in the time domain. When there are more than 4 DMRS ports used, all ports are spread with a spreading factor of four in the time domain.

For ePDCCH transmission, the system pre-configures a set of RBs for ePDCCH transmission. This configuration can be UE-specific, UE-group-specific, or cell-specific. Further, the configuration can be indicated to a UE via physical layer signaling or higher-layer signaling (e.g., Radio Resource Control (RRC) signaling). When the configuration is transmitted via physical layer signaling, it can be a special DCI in the legacy control channel.

When the ePDCCH region is configured, eCCEs are further allocated accordingly. There are basically two types of eCCE allocation, i.e., localized and distributed. In localized eCCE allocation, an eCCE includes resource elements from the same one resource block, and one resource block includes one or multiple eCCEs. In distributed eCCE allocation, an eCCE includes resources elements from multiple resource blocks, and one resource block includes multiple parts of multiple eCCEs.

Figure 3:
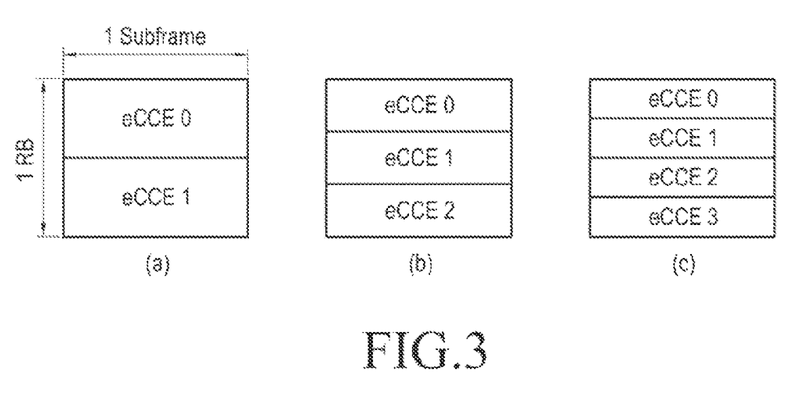
FIG. 3 illustrates different eCCE granularities for enhanced Control Channels.

FIG. 3 illustrates different eCCE granularities for enhanced Control Channels. Specifically, FIG. 3 illustrates examples where the granularity of eCCH is defined as ½, ⅓, and ¼ of a PRB in parts (a), (b), and (c), respectively.

Referring to FIG. 3, contiguous carriers in a subframe are grouped into one eCCE. Considering the uneven distribution of different types of reference signals, the number of REs per eCCE may vary depending on the position of the eCCE in a RB.

Figure 4:
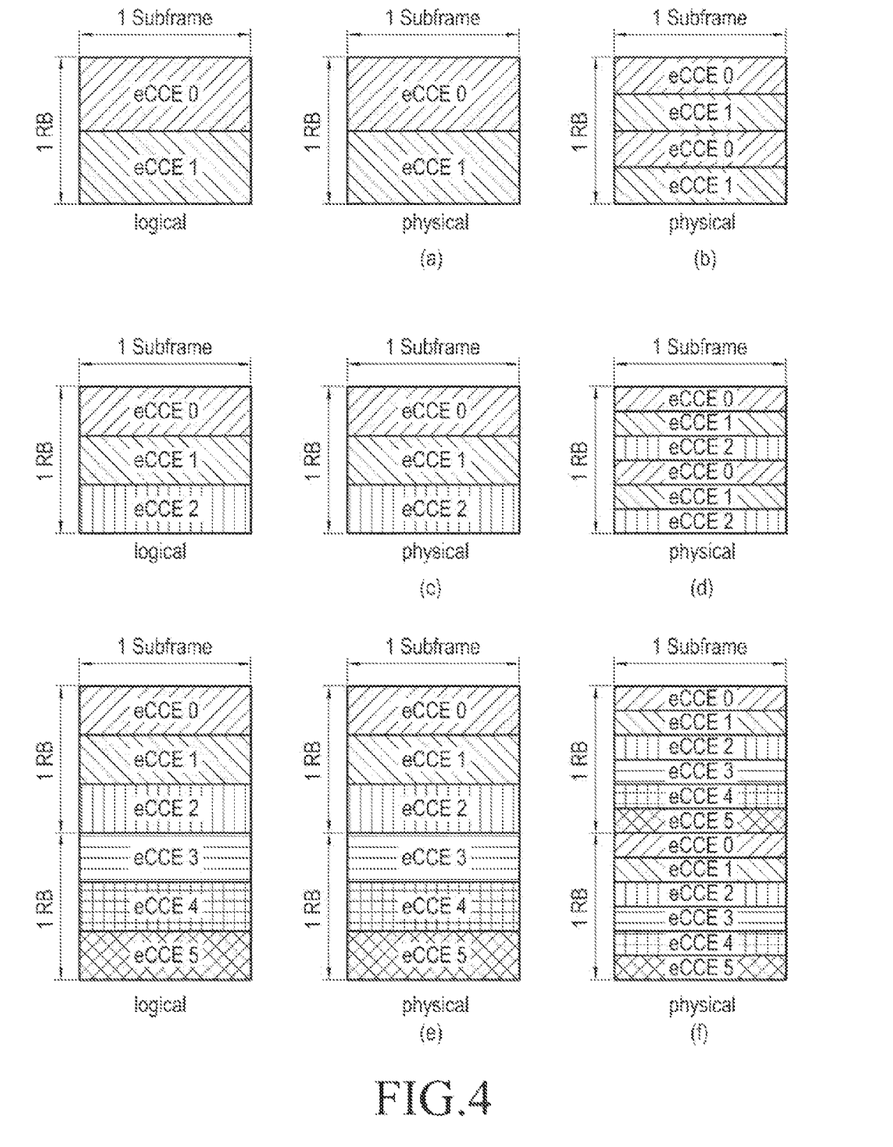
FIG. 4 illustrates different logical eCCEs to physical resource mapping.

FIG. 4 illustrates different logical eCCEs to physical resource mapping.

Referring to parts (b) and (d) in FIG. 4, to make the resource distribution more uniform, subcarriers which are uniformly distributed within an RB are grouped to form an eCCE. For such cases, the grouping of subcarriers can follow a simple modular operation, wherein a resource element (k,l) is included in an $i_{eCCE}^{RB}$-th eCCE within an RB, if (k mod N)=$i_{eCCE}^{RB}$, where N is the total number of eCCEs within a RB. Additionally, k is the subcarrier index within an RB and l is the OFDM symbol index within a subframe.

In FIG. 4, N=2 for parts (a) and (b), and N=3 for parts (c) and (d).

There are also a few contiguous subcarriers that are grouped into eCCE parts first, and distributed eCCE parts are further grouped into one eCCE. For example, in distributed 2-subcarrier eCCE part grouping a resource element (k,l) is included in the $i_{eCCE}^{RB}$-th eCCE within an RB if $$\left(\left\lfloor \frac{k}{2} \right\rfloor \bmod N\right) = i_{eCCE}^{RB},$$

where N is the total number of eCCEs within an RB.

Alternatively, RBs are firstly grouped into an RB group, each with more than one RB. Therefore, each eCCE includes multiple subcarriers (almost) uniformly distributed in the RB group. An example is illustrated in part (e) of FIG. 4, where an eCCE includes multiple subcarriers within two RBs.

As illustrated in FIG. 4, multiple eCCEs can be transmitted over a single RB with each logical eCCE having its own index. Additionally, each eCCE is transmitted over a set of REs, which do not intersect with a set of REs for another eCCE. Hereafter, the eCCE logical index is referred for eCCE reference unless otherwise addressed.

To decode an ePDCCH, a UE can follow another indication from an eNB that indicates where the DCIs are, or can blindly decode ePDCCHs in its search space. The another indication indicates where the DCIs are transmitted using either the legacy control channel or via higher-layer indication. The detail of such an indication is not particularly relevant to the scope of the present invention, and therefore, is not described in detail herein.

When blindly decoding the ePDCCHs, the search space is defined as a set of eCCEs aggregations for each aggregation level. In short, for each aggregation level, a search space is defined. For example, search space of aggregation level one includes a set of single eCCEs, and search space of aggregation level two includes a set of combinations of two eCCEs. In a legacy PDCCH, aggregation levels 1/2/4/8 are supported. The same aggregation levels are assumed for ePDCCH without losing generality.

The transmission of an ePDCCH is made in the data region of a subframe. Additionally, the reference signal that the UE uses to demodulate the ePDCCH is the DMRS. Because there are multiple DMRS ports in the LTE/LTE-A PRB, as described with reference to FIG. 2, the UE needs a method of determining which DMRS port to use when demodulating the ePDCCH.

A PDSCH can also be transmitted using the DMRS. In such a case, the control information in a PDCCH or an ePDCCH indicates which DMRS port to use to the UE. However, for an ePDCCH, there is no other control channel that notifies the UE which DMRS port to use for ePDCCH demodulation. Therefore, a rule or method for determining the DMRS port to use for ePDCCH demodulation must be defined.

When a DMRS is used for ePDCCH demodulation, a UE should previously identify which DMRS ports are used for ePDCCH transmission. Alternatively, the UE can acquire this information by exhaustive blind decoding with much more complexity. The information about DMRS port assignment can be static, e.g., always use port 7 and/or port 8. However, for better multiplexing support and interference averaging, it is also desirable to use different DMRS ports for different UEs multiplexed in a same RB.

DMRS ports may be predefined for each eCCE.

Figure 5:
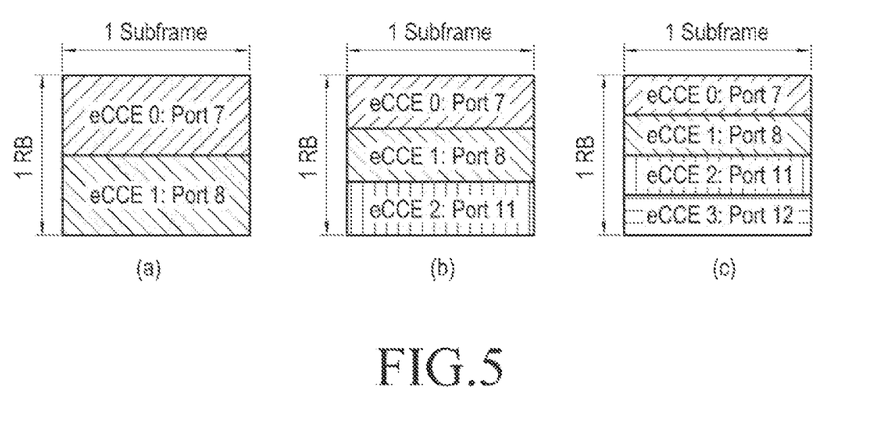
FIG. 5 illustrates an implicit mapping between eCCEs within a resource block and antenna ports.

FIG. 5 illustrates an implicit mapping between eCCEs within a resource block and DMRS ports.

Referring to FIG. 5, one port is bonded to one eCCE, i.e., the 0-th eCCE in an RB is always assigned with port 7, the 1st eCCE in an RB is always assigned with port 8, the 2nd eCCE in an RB is always assigned with port 11, etc. Note that using ports 11 and 12 can release the resources for DMRS ports #8/9/13/14 for PDSCH or ePDCCH transmission. The system can also use ports 9 and 10, instead of ports 11 and 12, respectively.

By using the implicit mapping between eCCEs and DMRS ports, the UE can derive the DMRS port to use when demodulating the ePDCCH, without explicit signaling from the eNB.

For example, if the UE is to demodulate and decode an ePDCCH on eCCE1 in part (c) of FIG. 5, the UE will implicitly assume that DMRS port 8 will be used. However, if the UE is to demodulate and decode an ePDCCH on eCCE3 in part (c) of FIG. 5, the UE will implicitly assume that DMRS port 12 will be used. It should be noted that the UE determination of which DMRS port to use for ePDCCH demodulation does not require any signaling from the eNB and is based on knowledge of the eCCE it is assuming for an ePDCCH. Multiple eCCEs can be distinguished by allocating indices, as illustrated in FIG. 3, 4, or 5.

Another method would be to distinguish eCCEs based on the location of within an RB.

As illustrated in FIG. 5, when an ePDCCH is transmitted, if it contains only one eCCE, the transmission should depend on the index of each eCCE, e.g., if the allocated eCCE is the 0-th eCCE within an RB, port 7 is used for this eCCE. ePDCCH transmission with a single eCCE is also referred to as ePDCCH transmission with aggregation level 1. Accordingly, ePDCCH transmission with 2, 4, or 8 eCCEs is also referred to as ePDCCH transmission with aggregation levels 2, 4, or 8, respectively.

If an ePDCCH has more than one eCCE, each eCCE may have a different port number. At the UE side, for each eCCE in the search space, the UE performs channel estimation per eCCE, based on which port is bonded to the eCCE.

Figure 6:
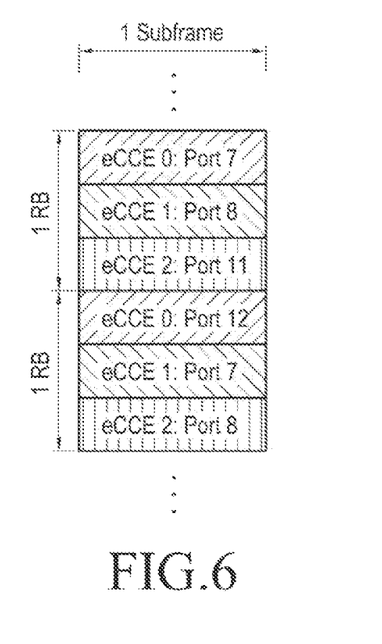
FIG. 6 illustrates an implicit mapping between eCCEs and antenna ports with port cycling applied across Resource Blocks (RBs)

FIG. 6 illustrates an implicit mapping between eCCEs and DMRS ports with port cycling applied across RBs. More specifically, FIG. 6 illustrates a port cycling pattern across RBs, where the mapping pattern is different from RB to RB in the frequency domain. This kind of mapping pattern may also change with respect to subframe index in the time domain. In this case, the UE would check the RB index and optionally the subframe index in addition to the eCCE index to determine the DMRS port for each eCCE. It is also noted that the bonding between antenna ports and eCCEs is not necessarily fixed within an RB.

As described above, an ePDCCH may use different antenna ports for higher aggregation levels. For example, if the UE needs to demodulate and decode an ePDCCH with aggregation level 2 on eCCE2 and eCCE3 in part (c) of FIG. 5, the UE will implicitly assume that DMRS ports 11 and 12 will be used. There will be complexities in channel estimations as the UE needs to monitor multiple DMRS antenna ports.

An ePDCCH may also use the same DMRS ports for demodulation for all its aggregated eCCEs. The set of DMRS ports can be determined by its starting/ending eCCE index.

Figure 7:
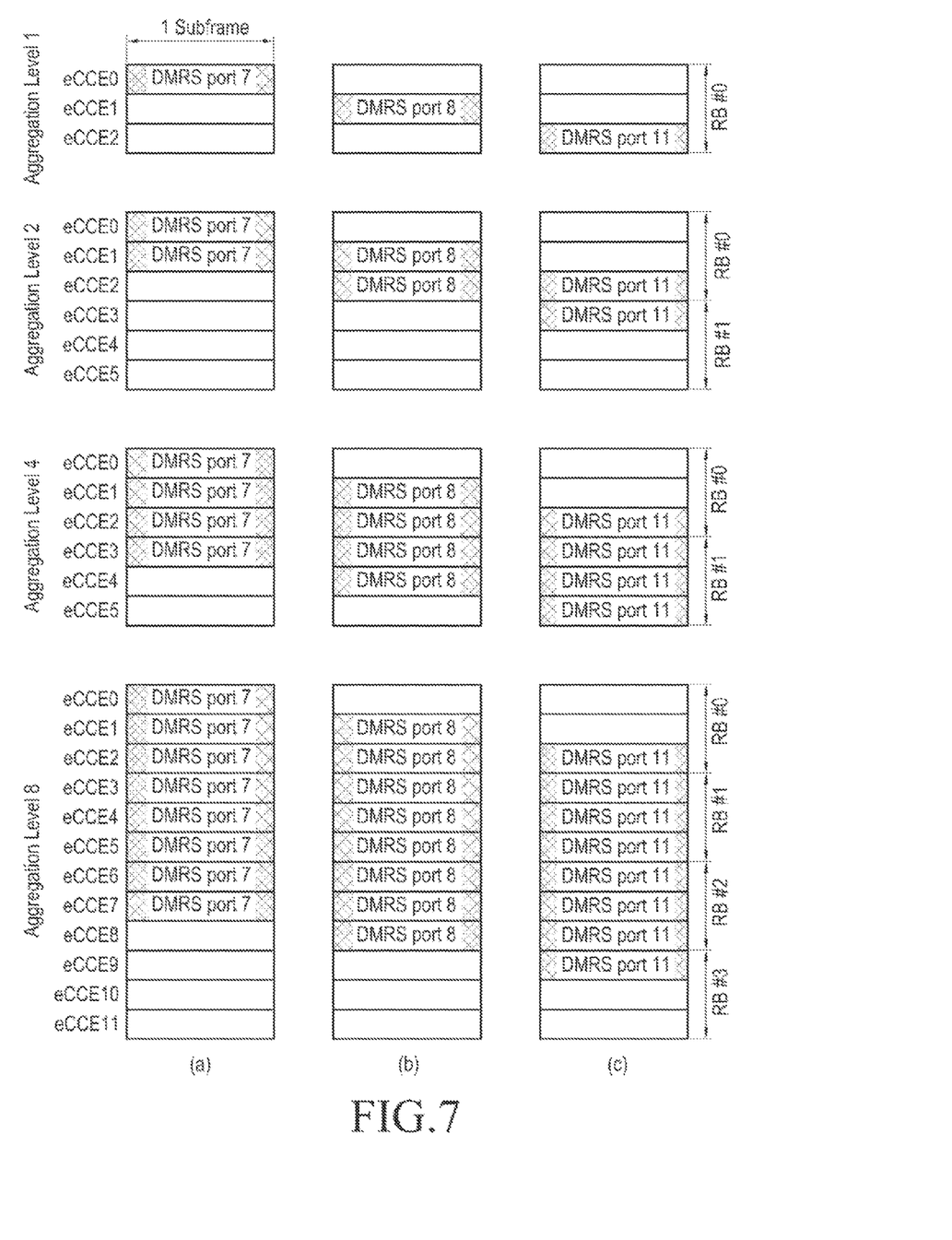
FIG. 7 illustrates an implicit mapping between eCCEs and antenna ports considering aggregation levels 1, 2, 4, and 8.

FIG. 7 illustrates an implicit mapping between eCCEs and antenna ports considering aggregation levels 1, 2, 4, and 8. Specifically, FIG. 7 illustrates aggregation level distribution cases when a ⅓-RB eCCE structure is used.

A port mapping pattern, as described above, is defined as a basic pattern, and a DMRS antenna ports is determined by the starting/ending index of the ePDCCH. For example, if the pattern in part (b) of FIG. 4 is selected as the basic pattern and an ePDCCH starts with the 0th eCCE in a RB, all of the eCCEs in FIG. 7 should use DMRS port 7 for transmission and reception, regardless of which aggregation level it is using. If an ePDCCH starts with the 1st eCCE in an RB, all of the eCCEs should use DMRS port 8 for transmission and reception, regardless of which aggregation level it is using, etc.

In FIGS. 5 to 7, only one port is used for each eCCE. However, it is also possible to assign more than two antenna ports for each of the eCCEs. For example, the DMRS ports can be partitioned into groups, each group including one or multiple antenna ports. The system maps one of the groups of DMRS ports to each of the eCCEs.

In an implementation, the system may configure the UE with the transmit layers of an ePDCCH. For example, if the ePDCCH is configured to have more than one layer, the system should assign multiple antenna ports to each eCCE. The UE will use the new port-group mapping rule when higher-layer transmission is configured.

There is another parameter of DMRS for the UE to acquire, which is referred as SCrambling ID (SCID). The SCID, being either 0 or 1, defines the sequence of DMRSs to be applied. For example, the system can define SCID=0 for all ePDCCHs. Alternatively, the system can adapt the SCID according to a UE-ID, e.g., SCID=UE-ID mod 2.

When mapping the eCCEs to DMRS ports, for an ePDCCH, where its starting CCE # is $n_{eCCE}^{starting}$, the following antenna ports are used for its transmission when one-layer transmission is defined as shown in Equation (1).

$$n_{DMRS\text{-}port}^{ePDCCH} = \begin{cases} 7 + n_{eCCE}^{starting} \bmod 4, & \text{if } n_{eCCE}^{starting} \bmod 4 < 2 \\ 9 + n_{eCCE}^{starting} \bmod 4, & \text{if } n_{eCCE}^{starting} \bmod 4 \geq 2 \end{cases} \quad (1)$$

The following antenna ports are used for ePDCCH transmission, when two-layer transmission is defined as shown in Equation (2).

$$n_{DMRS\text{-}port}^{ePDCCH} = \begin{cases} (7, 8) & \text{if } n_{eCCE}^{starting} \bmod 4 = 0 \\ (9, 10) & \text{if } n_{eCCE}^{starting} \bmod 4 = 1 \\ (11, 12) & \text{if } n_{eCCE}^{starting} \bmod 4 = 2 \\ (13, 14) & \text{if } n_{eCCE}^{starting} \bmod 4 = 3 \end{cases} \quad (2)$$

The following antenna ports are used for ePDCCH transmission, when two-layer transmission is defined as shown in Equation (3).

$$n_{DMRS\text{-}port}^{ePDCCH} = \begin{cases} (7, 8, 9, 10) & \text{if } n_{eCCE}^{starting} \bmod 2 = 0 \\ (11, 12, 13, 14) & \text{if } n_{eCCE}^{starting} \bmod 2 = 1 \end{cases} \quad (3)$$

The port number and port grouping may subject to changing depending on implementation.

In alternative embodiment, DMRS ports to be used for ePDCCH demodulation may be determined by an aggregation level of the ePDCCH and the index of the eCCE. As described above, the index of the eCCE corresponds to the location of the REs belonging to the particular eCCEs. Based on the eCCE structure illustrated in FIG. 3, where each eCCE occupies ¼ of an RB, the possible combination of ePDCCH aggregation levels is one of the following:

4 ePDCCHs of aggregation level 1
1 ePDCCH of aggregation level 2 and 2 ePDCCHs of aggregation level 1
2 ePDCCHs of aggregation level 2
1 ePDCCH of aggregation level 4

For each of the four cases above, the ePDCCHs may occur in different combinations with different eCCEs. For example, for 1 ePDCCH of aggregation level 2 and 2 ePDCCHs of aggregation level 1, the ePDCCH of aggregation level 2 may occur in any of the four eCCEs of an RB. Allowing such flexibility in ePDCCH transmission only increases the complexity involved in an ePDCCH configuration and an ePDCCH blind decoding, and therefore, is not preferable.

Figure 8:
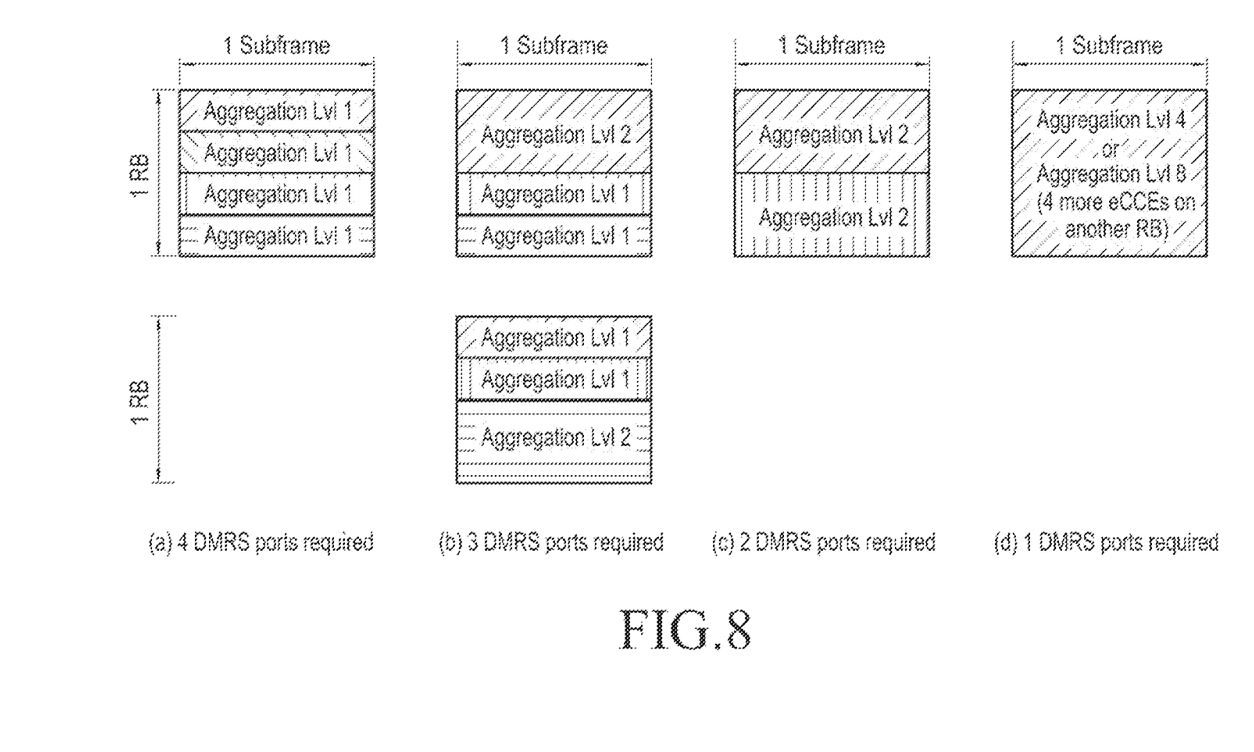
FIG. 8 illustrates configurations of eCCEs used for transmission of an enhanced Physical DownLink (DL) Control CHannel (ePDCCH) with different aggregation levels.

FIG. 8 illustrates eCCEs used for transmitting an ePDCCH with different aggregation levels.

In the method of ePDCCH transmission based on eCCE location for each aggregation level, the possible eCCEs for transmission of ePDCCH with aggregation level 2 is limited to either eCCE0 and eCCE1, or eCCE2 and eCCE3. By limiting the combination of eCCEs that can be used to transmit an ePDCCH of aggregation level 2, the complexity of searching for the ePDCCH simplifies for the UE. Additionally, the structure illustrated in FIG. 8 can be taken into consideration for linking a particular ePDCCH with a DMRS port.

In FIG. 8, a required number of DMRS ports for an ePDCCH transmission depends on an aggregation level of the ePDCCH. For example, when transmitting 4 ePDCCHs with aggregation level 1 in an RB, as illustrated in part (a) of FIG. 8, 4 DMRS ports are required for the RB. However, when transmitting 1 ePDCCH with aggregation level 4 in an RB, as illustrated in part (d) of FIG. 8, only 1 DMRS port is required for the RB. Taking into account the eCCEs used for the transmission of ePDCCH for different aggregation levels, the following methods determine DMRS ports for each aggregation level.

Aggregation level 1:
ePDCCH on eCCE0 utilizes DMRS port 7
ePDCCH on eCCE1 utilizes DMRS port 8
ePDCCH on eCCE2 utilizes DMRS port 9
ePDCCH on eCCE3 utilizes DMRS port 10
Aggregation level 2:
ePDCCH on eCCE0 and eCCE1 utilizes DMRS port 7
ePDCCH on eCCE2 and eCCE3 utilizes DMRS port 8
Aggregation level 4: ePDCCH utilizes DMRS port 7
Aggregation level 8: ePDCCH utilizes DMRS port 7

Although localized eCCE transmissions, without losing generality, is described above, the rules described above can also be applied to distributed eCCE transmissions, where the eCCE indices are sent to a modular operation to obtain relative indices. The relative indices are used to determine the DMRS port, instead of the eCCE indices within an RB (group), as described for localized cases.

Figure 9:
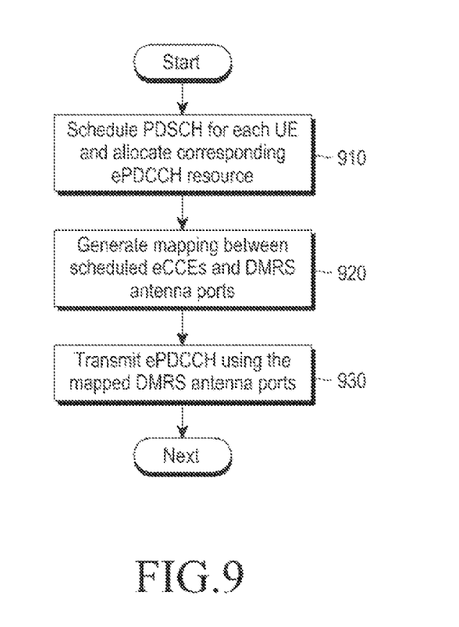
FIG. 9 illustrates ePDCCH scheduling procedures at an eNB side according to an embodiment of the present invention.

FIG. 9 illustrates ePDCCH scheduling procedures at an eNB side according to an embodiment of the present invention.

Referring to FIG. 9, for each subframe, the eNB schedules ePDCCH and PDSCH resources for each UE to be scheduled in step 910. For each eCCE allocated for an ePDCCH purpose, the eNB decides which DMRS port is used according to the mapping rules described above, in step 920. In step 930, the eNB transmits the scheduled ePDCCH using the respective DMRS ports and a PDSCH schedule.

Figure 10:
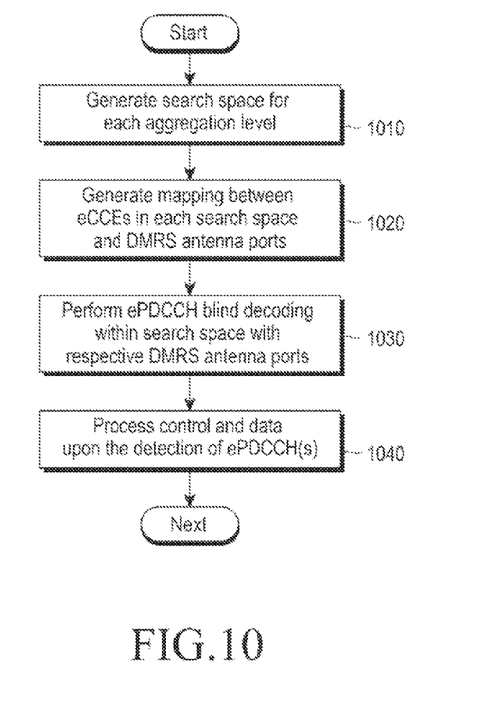
FIG. 10 illustrates ePDCCH scheduling procedures at a UE side according to an embodiment of the present invention.

FIG. 10 illustrates ePDCCH scheduling procedures at a UE side according to an embodiment of the present invention.

Referring to FIG. 10, for each subframe, the UE generates the search spaces for each ePDCCH aggregation level in step 1010. For each possible resource assignment in the search space, the UE decides which DMRS port is used according to the mapping rules as described above, in step 1020. In step 1030, the UE attempts to blindly decode the ePDCCH by checking each of the possible resource assignments in the search spaces, using respective DMRS ports. After an ePDCCH is decoded, the UE continues to perform follow-up process for both control and data channels in step 1040.

Figure 11:
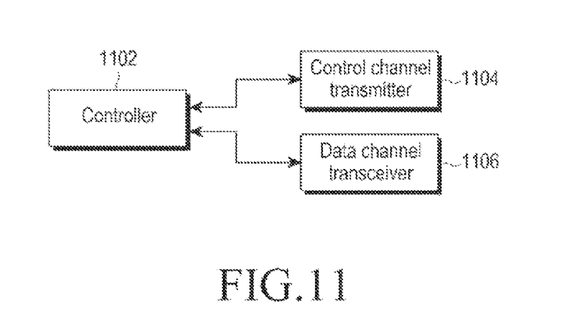
FIG. 11 is a block diagram illustrating an eNB according to an embodiment of the present invention.

FIG. 11 is a block diagram illustrating an eNB according to an embodiment of the present invention.

Referring to FIG. 11, the eNB includes a controller 1102, a control channel transmitter 1104, and a data channel transceiver 1106. The controller 1102 schedules PDSCH for each UE and generates control information thereof. The control channel transmitter 1104 transmits the control information using one or more CCEs and one or more antenna ports under the control of the controller 1102.

Figure 12:
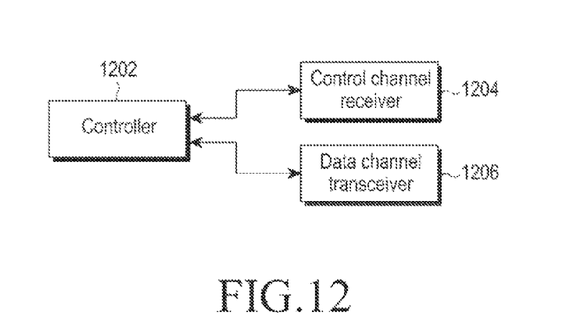
FIG. 12 is a block diagram illustrating a UE according to an embodiment of the present invention.

FIG. 12 is a block diagram illustrating a UE according to an embodiment of the present invention.

Referring to FIG. 12, the UE includes a controller 1202, a control channel receiver 1204, and a data channel transceiver 1206. The control channel receiver 1204 receives control information using one or more CCEs and one or more transmit antenna ports under the control of the controller 1202. The controller 1202 control the reception of the control channel receiver 1204 and decodes/interprets the received control information.

While the present invention has been shown and described with reference to certain embodiments thereof, it will be understood by those skilled in the art that various changes in form and details may be made therein without departing from the spirit and scope of the present invention as defined by equivalents to the claims as well as the appended claims.

What is claimed is:

1. A method for transmitting control information to a User Equipment (UE) in a wireless communication system in which multiple antenna ports are defined, the method comprising:
   transmitting, through Radio Resource Control (RRC) signaling, information representative of a set of resource blocks for transmitting the control information;
   generating the control information; and
   transmitting the control information based on at least one enhanced Control Channel Element (eCCE), at least one antenna port, and the set of resource blocks, wherein the at least one antenna port is determined according to a starting index of the at least one eCCE and an IDentifier (ID) of the UE, when using localized eCCE allocation within the set of resource blocks.

2. The method of claim 1, wherein the starting index includes one of:

a starting index of the at least one eCCE within all resources allocated for potential control information transmission; and a starting index of the at least one eCCE within a resource block.

3. The method of claim 1, wherein the at least one antenna port is represented by reference signals transmitted to the UE.

4. The method of claim 1, wherein the at least one antenna port is determined further considering one of:
- a maximum eCCE index of at least one eCCE used for the transmission of the control information, within all resources allocated for potential control information transmission;
- a minimum eCCE index of the at least one eCCE used for the transmission of the control information, within all the resources allocated for potential control information transmission;
- a maximum eCCE index of the at least one eCCE used for the transmission of the control information, within a resource block;
- a minimum eCCE index of the at least one eCCE used for the transmission of the said control information, within a resource block; and
- a number of the at least one eCCE used for the transmission of the control information.

5. The method of claim 1, wherein the at least one antenna port is determined further considering an index of a current subframe.

6. The method of claim 1, wherein the at least one eCCE is a portion of a resource block including a plurality of eCCEs.

7. A method for receiving control information from an enhanced Node B (eNB) in a wireless communication system in which multiple antenna ports are defined, the method comprising:
- receiving, through Radio Resource Control (RRC) signaling, information representative of a set of resource blocks for receiving the control information;
- receiving the control information transmitted based on at least one enhanced Control Channel Element (eCCE) at least one antenna port, and the set of resource blocks; and
- decoding the control information, wherein the at least one antenna port is determined according to a starting index of the at least one eCCE and an IDentifier (ID) of the UE, when using localized eCCE allocation within the set of resource blocks.

8. An apparatus of a User Equipment (UE) for receiving control information from an enhanced Node B (eNB) in a wireless communication system in which multiple antenna ports are defined, the apparatus comprising:
- a receiver that receives, through Radio Resource Control (RRC) signaling, information representative of a set of resource blocks for receiving the control information, and receives the control information transmitted, based on at least one enhanced Control Channel Element (eCCE) at least one antenna port, and the set of resource blocks; and
- a controller that decodes the control information, wherein the at least one antenna port is determined according to a starting index of the at least one eCCE and an IDentifier (ID) of the UE, when using localized eCCE allocation within the set of resource blocks.

9. The apparatus of claim 8, wherein the at least one antenna port is determined further considering an aggregation level of the at least one eCCE.

10. The apparatus of claim 8, wherein the starting index includes one of:

a starting index of the at least one eCCE within all resources allocated for potential control information transmission; and a starting index of the at least one eCCE within a resource block.

11. The apparatus of claim 8, wherein the at least one antenna port is represented by reference signals transmitted to the UE.

12. The apparatus of claim 8, wherein the at least one antenna port is determined further considering one of:
- a maximum eCCE index of at least one eCCE used for the transmission of the control information, within all resources allocated for potential control information transmission;
- a minimum eCCE index of the at least one eCCE used for the transmission of the control information, within all the resources allocated for potential control information transmission;
- a maximum eCCE index of the at least one eCCE used for the transmission of the control information, within a resource block;
- a minimum eCCE index of the at least one eCCE used for the transmission of the said control information, within a resource block; and
- a number of the at least one eCCE used for the transmission of the control information.

13. The apparatus of claim 8, wherein the at least one antenna port is determined further considering an index of a current subframe.

14. The apparatus of claim 8, wherein the at least one eCCE is a portion of a resource block including a plurality of eCCEs.

15. The method of claim 1, wherein the at least one antenna port is determined further considering an aggregation level of the at least one eCCE.

16. The method of claim 7, wherein the at least one antenna port is determined further considering an aggregation level of the at least one eCCE.

17. The method of claim 7, wherein the starting index includes one of:
- a starting index of the at least one eCCE within all resources allocated for potential control information transmission; and
- a starting index of the at least one eCCE within a resource block.

18. The method of claim 7, wherein the at least one antenna port is represented by reference signals transmitted to the UE.

19. The method of claim 7, wherein the at least one antenna port is determined further considering one of:
- a maximum eCCE index of at least one eCCE used for the transmission of the control information, within all resources allocated for potential control information transmission;
- a minimum eCCE index of the at least one eCCE used for the transmission of the control information, within all the resources allocated for potential control information transmission;
- a maximum eCCE index of the at least one eCCE used for the transmission of the control information, within a resource block;
- a minimum eCCE index of the at least one eCCE used for the transmission of the said control information, within a resource block; and
- a number of the at least one eCCE used for the transmission of the control information.

20. The method of claim 7, wherein the at least one antenna port is determined further considering an index of a current subframe.

* * * * *